UNITED STATES PATENT OFFICE.

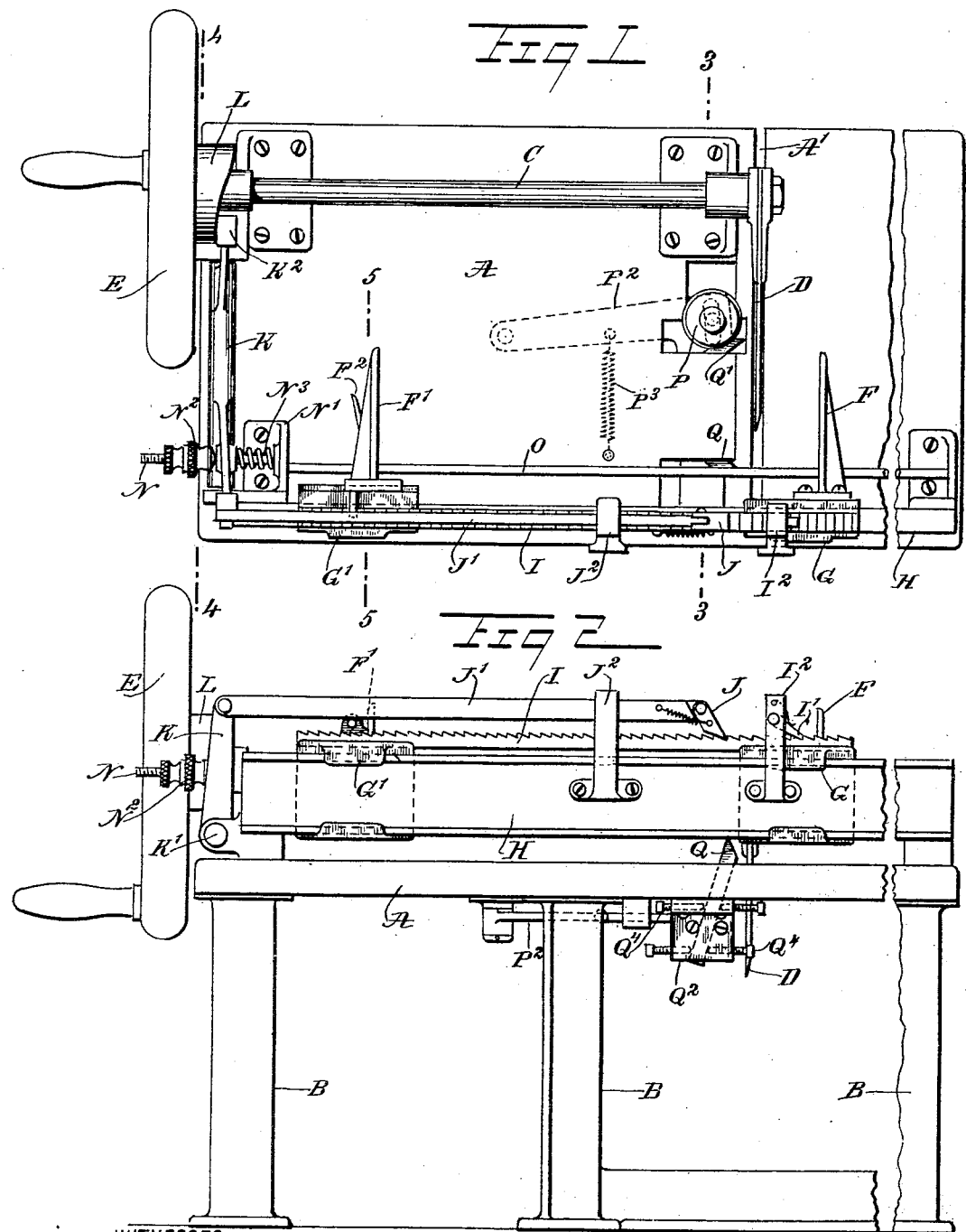

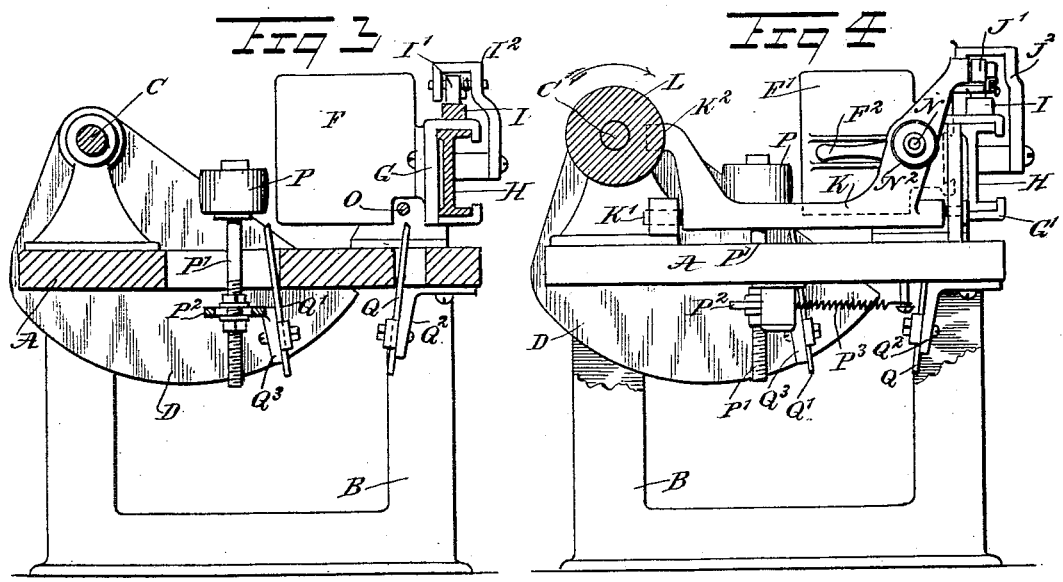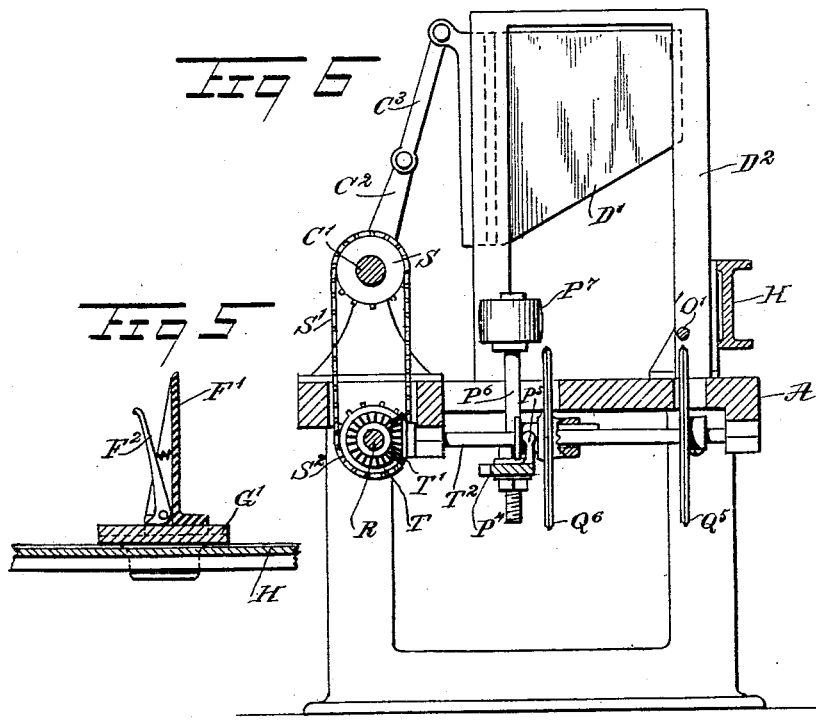

CHARLES J. VANN, OF BROOKLYN, NEW YORK.

BREAD-CUTTING MACHINE.

SPECIFICATION forming part of Letters Patent No. 713,539, dated November 11, 1902.

Application filed October 30, 1901. Serial No. 80,523. (No model.)

*To all whom it may concern:*

Be it known that I, CHARLES J. VANN, a citizen of the United States, and a resident of the city of New York, borough of Brooklyn, in the county of Kings and State of New York, have invented a new and Improved Bread-Cutting Machine, of which the following is a full, clear, and exact description.

The object of the invention is to provide a new and improved bread-cutting machine which is simple and durable in construction, more especially designed for use in hotels, restaurants, boarding-houses, and the like, and arranged to cut the slices to any desired thickness and to trim the same to a uniform shape.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is a side elevation of the same. Fig. 3 is a transverse section of the same on the line 3 3 of Fig. 1. Fig. 4 is a similar view of the same on the line 4 4 of Fig. 1. Fig. 5 is a transverse section of one of the clamps for holding a loaf, the section being on the line 5 5 of Fig. 1; and Fig. 6 is transverse section of a modified form of the improvement.

The improved bread-cutting machine illustrated in Figs. 1 to 5 is mounted on a suitably-constructed table A, having legs B for supporting the table the desired distance above the floor. On the table A are arranged suitable bearings for a longitudinally-extending shaft C, carrying at its forward end a knife D for cutting a loaf into slices, and on the rear end of the said shaft is secured a hand-wheel E or a pulley for imparting a rotary motion to the shaft C to cause the knife D to swing around through a slot A' in the table A and to cut the loaf fed forward over the table into slices. The loaf is held or clamped between clamping-plates F and F', of which the clamping-plate F is secured to and projects transversely from a slide G, mounted to slide longitudinally on a guideway H, carried by the table A. The other clamping-plate F' is held longitudinally adjustable on a slide G', likewise mounted to slide longitudinally on the guideway H, the said clamping-plate F' being preferably mounted to slide on the slide G' to adjust the clamping-plate F' to loaves of different lengths, said clamping-plate being secured in place after the desired adjustment is made by a suitable clamping-lever $F^2$, as plainly shown in Figs. 1 and 5. The slides G and G' are rigidly connected with each other by a toothed bar I, forming part of the intermittent feed, to move the clamping-plates F and F' and the loaf carried thereby longitudinally for the knife D to cut slices from the loaf. The toothed bar I is engaged by a spring-pressed pawl J, held on the forward end of a link J', mounted to slide near its forward end in a suitable bearing $J^2$, carried by the guideway H. The rear end of the link J' is pivotally connected with a lever K, fulcrumed at K' on the table A and having an arm $K^2$ adapted to be engaged by a cam L, secured on the shaft C or on the hand-wheel E to impart a rocking motion to the lever K at the time the shaft C is rotated, the rocking motion of the lever K causing the link J' and pawl J to impart an intermittent forward sliding motion to the toothed bar I, the slides G G', and the clamping-plates F F', carrying the loaf. The relation between the knife D and the intermittent feed is such that during the time the feed is at rest the knife cuts the loaf and during the time the knife is out of engagement with the loaf the feed is active to feed the loaf forward the desired distance corresponding to the thickness of the slice to be cut from the loaf.

In order to regulate the thickness of the slices, the following device is provided: Through the lever K extends longitudinally a rod N, fixed on a bracket N', carried by the table A, and on the outer end of the rod N screws a nut $N^2$, against which the outer face of the lever K is pressed by the action of a spring $N^3$, coiled on the rod N between the bracket N' and the lever K. By screwing up the nut $N^2$ the lever K is caused to swing forward, so that the arm $K^2$ is engaged for a shorter period by the cam L, and consequently the lever K receives less throw and a consequent less forward movement is given to the toothed bar I, the slides G G', the clamping-plates F F', and the loaf held thereon, so that the next slice cut from the loaf is of a less thickness. When the nut N² is screwed outwardly, more throw is given to the lever K and the loaf is fed forward a longer distance, so that the next slices cut are comparatively thicker. The loaf during its forward movement travels between a fixed rod O and the peripheral surface of a roller P, journaled at the upper end of a stud P', attached to an arm P², fulcrumed on the under side of the table A and pressed on by a spring P³ to hold the roller P in frictional contact with one side of the loaf. The loaf during this forward movement is also engaged by the upper cutting edges of angular knives Q and Q', extending upwardly through openings in the table A adjacent to the rod O and roller P, so that the loaf is trimmed during its forward movement. The knives Q and Q' are held adjustably in keepers Q² and Q³, of which the keeper Q² is secured to the under side of the table A and the keeper Q³ is secured to or forms part of the spring-pressed arm P², previously mentioned. Thus by the arrangement described the trimmer-knife Q' adjusts itself with the roller P to loaves of different thicknesses. The trimmer-knives Q and Q' can be adjusted longitudinally by suitable set-screws Q⁴, held on the keepers, as plainly indicated in Fig. 2. When the machine is in operation and the loaf is intermittently fed forward, as described, and the slices are cut off by the knife D, the trimmer-knives Q and Q' trim the sides of the loaf, so that the slices are not only of a uniform thickness, but are of approximately the same shape.

In order to prevent accidental return movement of the toothed bar I and the parts connected therewith, I provide a spring-pressed dog I', engaging the toothed bar and fulcrumed on a bracket I², carried by the guideway H.

In the modification shown in Fig. 6 the knife D' has an angular cutting edge and is mounted to reciprocate vertically in a suitable guideway D², carried by the table A, and the said knife receives a reciprocating motion from a shaft C', driven by a hand wheel or pulley, the same as the shaft C, above described. On the shaft C' is secured a crank-arm C², connected by a pitman C³ with the knife D', so that when the shaft C' is rotated the knife is caused to reciprocate to cut the loaf fed forward over the table under the knife, the cut being a draw cut, the same as the one made by the knife D. The shaft C' drives a shaft R by means of sprocket-wheels S S² and a sprocket-chain S', and the said shaft R is connected by bevel gear-wheels T and T' with a shaft T², extending transversely on the under side of the table A and journaled in suitable bearings carried by the table. On this shaft T² are held rotary trimmer-knives Q⁵ and Q⁶, of which the rotary knife Q⁵ is secured on the shaft T² and the knife Q⁶ is mounted to turn with the shaft and to slide thereon to adjust the knife Q⁶ to different widths of loaves. For imparting a sliding motion to the knife Q⁶ on the shaft T² a fork P⁵ is provided, held on a spring-pressed arm P⁴, carrying the stud P⁶ of a roller P⁷, similar to the roller P, previously mentioned. It is evident that when the shaft C' is rotated a rotary motion is transmitted to the shafts R and T², so that the trimmer-knives Q⁵ and Q⁶ are revolved to trim the sides of the loaf as the latter is fed forward over the table A by the feed mechanism above described, and shown in Figs. 1 to 5.

Having thus described my invention, I claim as new and desire to secure by Letters Patent—

1. A bread-cutting machine, comprising a revoluble shaft, a knife connected with the shaft for cutting a loaf into slices, a clamping device for holding the loaf, an intermittent feed for the said clamping device and controlled from the said shaft, and trimmer-knives for trimming the sides of the loaf as the latter is fed forward, as set forth.

2. A bread-cutting machine, comprising a revoluble shaft, a knife connected with the shaft for cutting a loaf into slices, a clamping device for holding the loaf, an intermittent feed for the said clamping device and controlled from the said shaft, and trimmer-knives for trimming the sides of the loaf as the latter is fed forward, one of the said knives being spring-pressed and movable toward and from the other knife, as set forth.

3. A bread-cutting machine, comprising a revoluble shaft, a knife connected with the shaft for cutting a loaf into slices, a clamping device for holding the loaf, an intermittent feed for the said clamping device and controlled from the said shaft, trimmer-knives for trimming the sides of the loaf as the latter is fed forward, and a roller engaging one side of the loaf and a rod engaging the other side of the loaf, as set forth.

4. A bread-cutting machine, comprising a revoluble knife arranged for making a draw cut on a loaf, a clamp for engaging and supporting the loaf, an intermittent feed for the said clamp, and a trimmer for trimming the sides of the loaf during the forward movement of the clamp and loaf, as set forth.

5. A bread-cutting machine, comprising a knife for cutting a loaf into slices, a clamping device for holding the loaf, the said clamping device comprising connected slides, a guideway for the slides, and clamping-plates carried by said slides, one of said clamping-plates being adjustable, a feed mechanism for the clamping device, and trimmer-knives for trimming the sides of the loaf, as set forth.

6. A bread-cutting machine, comprising a table, a shaft mounted to turn in bearings carried by the table, a knife connected with the shaft for cutting a loaf into slices, a clamping device for clamping the loaf, a lever mounted to rock, connections between the said lever and the clamping device for imparting an intermittent feed to the latter, a cam on the shaft and adapted to engage an arm on the lever to impart a rocking motion to the lever, a bracket carried by the table, a rod on said bracket and extending through the lever, a nut screwing on the free end of the rod, and a coiled spring on the rod between the bracket and the lever, as set forth.

7. A bread-cutting machine, comprising a knife for cutting a loaf into slices, a clamping device for holding the loaf, a feed mechanism for the clamping device, a fixed rod engaging one side of the loaf, and a roller journaled on a spring-pressed arm and engaging the other side of the loaf, as set forth.

8. A bread-cutting machine, comprising a knife for cutting a loaf into slices, a clamping device for holding the loaf, an intermittent feed for the said clamping device, means for engaging the opposite sides of the loaf, and trimmer-knives for trimming the sides of the loaf as the latter is fed forward.

9. In a bread-cutting machine, a clamping device for a loaf comprising clamping-plates, and slides carrying the same, one of said clamping-plates being adjustable on the slide, a toothed bar connecting the slides, a pawl engaging the toothed bar, a link carrying said pawl, a lever connected with the link and means for engaging the lever to impart a rocking motion thereto, as set forth.

10. In a bread-cutting machine, a revoluble shaft, a knife connected with the shaft for cutting a loaf into slices, a clamping device for holding the loaf, a lever mounted to rock, connections between the said lever and the clamping device for imparting an intermittent feed to the clamping device, a fixed rod extending through the lever, a nut screwing on the outer or free end of said rod, a spring for holding the lever in contact with said nut, and means for rocking the lever from said shaft, as set forth.

11. A bread-cutting machine, comprising a table, a longitudinally-extending guideway carried by the table, a clamping device for the loaf, and mounted to slide on the guideway, a revoluble shaft, a knife connected with the shaft for cutting the loaf into slices, trimmer-knives for trimming the edges of the loaf, a lever mounted to rock, connections between the said lever and the clamping device for imparting an intermittent feed to the clamping device, means for imparting a rocking motion to the lever from the said shaft, and means for regulating the throw of the lever, as set forth.

In testimony whereof I have signed my name to this specification in the presence of two subscribing witnesses.

CHARLES J. VANN.

Witnesses:
    THEO. G. HOSTER,
    EVERARD B. MARSHALL.